(12) United States Patent
Becker et al.

(10) Patent No.: US 12,540,110 B2
(45) Date of Patent: Feb. 3, 2026

(54) DIHYDROXYLATION OF OLEFINS USING OSMATE (VI) SALTS

(71) Applicant: INTERNATIONAL FLAVORS & FRAGRANCES INC., Union Beach, NJ (US)

(72) Inventors: Yigal Becker, Tel-Aviv (IL); Mohamad Gara, Jatt Village (IL)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 608 days.

(21) Appl. No.: 17/774,021

(22) PCT Filed: Nov. 4, 2020

(86) PCT No.: PCT/US2020/058802
§ 371 (c)(1),
(2) Date: May 3, 2022

(87) PCT Pub. No.: WO2021/091957
PCT Pub. Date: May 14, 2021

(65) Prior Publication Data
US 2022/0388931 A1 Dec. 8, 2022

Related U.S. Application Data

(60) Provisional application No. 62/930,280, filed on Nov. 4, 2019.

(51) Int. Cl.
| | | |
|---|---|---|
| *C07C 29/48* | (2006.01) |
| *B01J 23/46* | (2006.01) |
| *B01J 23/58* | (2006.01) |
| *B01J 31/02* | (2006.01) |
| *C07C 29/78* | (2006.01) |

(52) U.S. Cl.
CPC ............ *C07C 29/48* (2013.01); *B01J 23/466* (2013.01); *B01J 23/58* (2013.01); *B01J 31/0202* (2013.01); *C07C 29/78* (2013.01); *B01J 2231/70* (2013.01)

(58) Field of Classification Search
CPC .............................................. C07C 29/48–50
See application file for complete search history.

(56) References Cited

U.S. PATENT DOCUMENTS

| | | | |
|---|---|---|---|
| 3,960,899 A | 6/1976 | Giraudi et al. | |
| 5,126,494 A | 6/1992 | Gilheany et al. | |
| 5,260,461 A | 11/1993 | Hartung et al. | |
| 5,516,929 A | 5/1996 | Sharpless et al. | |
| 5,856,497 A * | 1/1999 | Roth ...................... C07C 29/48 | 564/336 |
| 5,892,062 A | 4/1999 | Pickenhagen et al. | |
| 6,825,377 B1 * | 11/2004 | Beller ................... C07F 9/5004 | 560/186 |
| 2003/0153794 A1* | 8/2003 | Choudary ............... C07C 29/48 | 568/852 |
| 2003/0176746 A1 | 9/2003 | Choudary et al. | |

FOREIGN PATENT DOCUMENTS

| | | |
|---|---|---|
| CN | 101085721 A | 12/2007 |
| EP | 0102154 A1 | 3/1984 |

OTHER PUBLICATIONS

Bonomo, L. et al. "Ruthenium-Catalyzed Highly Chemoselective Hydrogenation of Aldehydes" ChemCatChem 2015, 7, 907-910 in combination with the Supporting information pp. 1-96 (Year: 2015).*
Merlani, M. I. et al. "Synthesis of Several 5_-D-Homosteroid Derivatives Based On Tigogenin" Chemistry of Natural Compounds, vol. 50, No. 3, Jul. 2014 (Year: 2014).*
International Search Report for International Application No. PCT/US2020/058802, issued Feb. 25, 2021, 5 pages.
Choudary et al., A Trifunctional Catalyst for One-Pot Synthesis of Chiral Diols via Heck Coupling-N-Oxidation-Asymmetric Dihydroxylation: Application for the Synthesis of Diltiazem and Taxol Side Chain, J. Org. Chem, 2003, 68, pp. 1736-1746.
Sharpless, et al., The Osmium-Catalyzed Asymmetric Dihydroxylation: A New Ligand Class and a Process Improvement, J. Org. Chem., vol. 57, No. 10, 1992, 4 pages.
Dupau, et al., "Osmium-Catalyzed Dihydroxylation of Olefins in Acidic Media: Old Process, New Tricks", Adv. Synth. Catal. 2002, 344, No. 3+4, pp. 421-433.
Tius, "Synthesis of the cryptophycins", Tetrahedron 58, 2002, pp. 4343-4367.
McFadzean, Belinda Julie. The kinetics and associated equilibria of high oxidation state osmium complexes. Diss. PhD thesis, Nelson Mandela Metropolitan University, 2007 (https://core. ac. uk/download/pdf/49241525.pdf, accessed May 30, 2019), 2007.
Ko, S. Y., Malik, M., & Dickinson, A. F. (1994). An Access to erythro-Diols via Sharpless's Asymmetric Dihydroxylation Reaction. The Journal of Organic Chemistry, 59(9), 2570-2576.

* cited by examiner

*Primary Examiner* — Medhanit W Bahta

(57) ABSTRACT

A highly efficient synthesis of cis-diol compounds through cis-dihydroxylation of olefins using osmate (VI) salt as catalysts is disclosed, which has found important application in efficient large-scale preparation of, among others, α,α-cedranediol from α-cedrene.

17 Claims, No Drawings

DIHYDROXYLATION OF OLEFINS USING OSMATE (VI) SALTS

CROSS-REFERENCE TO RELATED APPLICATION

This application claims priority to U.S. Application Ser. No. 62/930,280 filed Nov. 4, 2019, the content of which is incorporated by reference in its entirety.

FIELD OF THE INVENTION

The present invention relates to a method for preparing diol compounds through dihydroxylation of olefins, which provides a highly efficient synthesis of α,α-cedranediol through cis-dihydroxylation of α-cedrene.

BACKGROUND OF THE INVENTION

α,α-Cedranediol is an intermediate for synthesis of (4aR, 5R,7aS,9R)-octahydro-2,2,5,8,8,9a-hexamethyl-4H-4a,9-methanoazuleno(5,6-d)-1,3-dioxole (Ambrocenide®), an extremely powerful woody-ambery note. Two approaches have been reported for preparation of α,α-cedranediol. One approach is based on acid-catalyzed hydrolysis of α-cedrene epoxide, and the other is direct osmium tetroxide-catalyzed dihydroxylation of α-cedrene. Hydrolysis of α-cedrene epoxide often affords a mixture of products and isolation of α,α-cedranediol involves tedious operations and often results low yields.

For example, the hydrolysis of (–)-α-cedrene epoxide at 20° C. in presence of 4% aq. $H_2SO_4$ was reported to give epimeric cedrenones and a diol presumably α,β-cedranediol (Recherches, Volume 16, Pages 104-6 (1967)). A modified process for hydrolysis of (–)-α-cedrene epoxide conducted in the presence of 10% aq. $H_2SO_4$ and aliquote R336 gave a mixture of diastereoisomers in only 37.6% yield (U.S. Pat. No. 5,892,062). U.S. Pat. No. 5,892,062 discloses two methods for preparation of α-cedrene epoxide, one through epoxidation with 40% peracetic acid in the presence of sodium acetate in diethyl ether, and the other through the standard osmium-catalyzed asymmetric dihydroxylation using AD-mix (J. Org. Chem., 57 (10), pp 2768-2771 (1992)). However, attempts by the present inventors by following the reported methods did not have much success. Hydrolysis of α-cedrene epoxide according to the reaction conditions disclosed in Example 4 of U.S. Pat. No. 5,892,062 followed by GC-MS analysis revealed that the desired α,α-cedranediol was accompanied by four by-products:

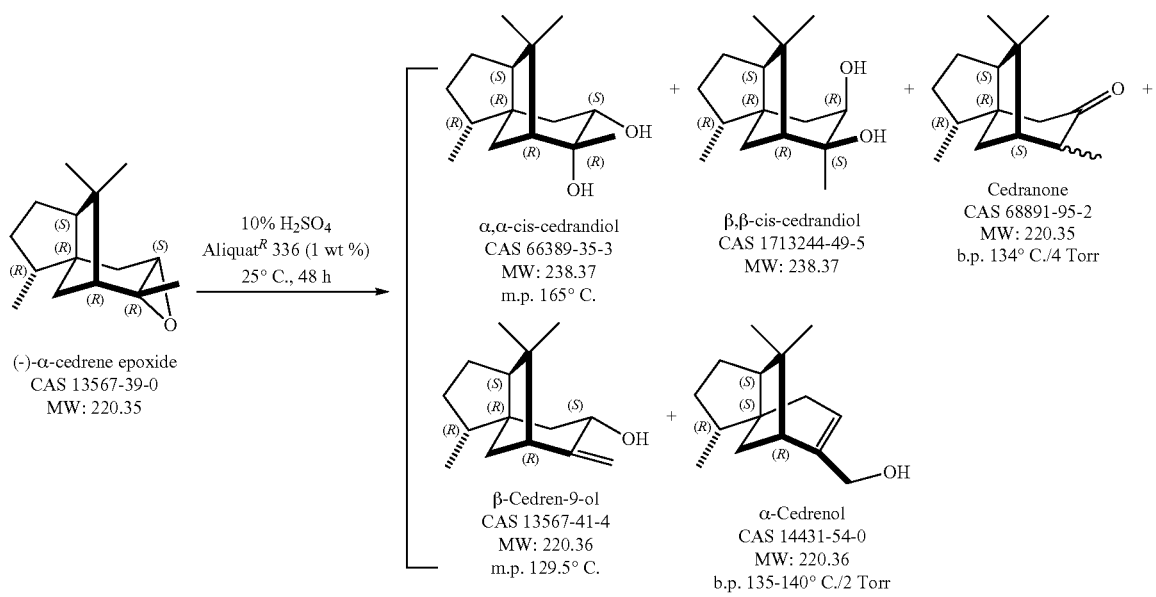

This composition is also described in WO 2017186973. Repeated recrystallization of the mixture from aqueous ethanol gave α,α-cedranediol in only 5-6% yield; therefore, this method is not suitable for economic manufacture of the desired diol.

Preparation of α,α-cedranediol by the stoichiometric osmium tetroxide dihydroxylation of α-cedrene was reported to proceed exclusively from the least shielded side (J. Org. Chem. USSR. 8[6], 1190 (1972)). A reaction of α-cedrene with one equivalent of $OsO_4$ in pyridine (Py) at 20° C. for 4 days gave α,α-cadranediol having a melting point of 159-160° C. in 31% isolated yield. Criegee (Justus Liebigs Ann. Chem., 550[1], 99 (1942)) reported that pyridine markedly catalyzed the reaction of olefins with osmium tetroxide, including the bulky olefins dibiphenylene ethylene, tetraphenylethylene and phenanthrene, and isolated the $OsO_3·2Py$ complex on treatment of $OsO_4$ with pyridine in cyclohexane-ethanol.

An efficient regioselective osmium tetroxide-catalyzed dihydroxylation of pregnadiens was first reported by Upjohn Co. (U.S. Pat. No. 2,769,824) using N-methylmorpholine oxide (NMO) or other tertiary aliphatic amine oxides as reoxidants. The reaction in the presence of 1-5 mol % $OsO_4$ in tert-butanol and water required several days at room temperature to achieve partial conversion. Although addition of water and pyridine was found to have some beneficial effects on the catalytic efficiency, the pyridine effect cannot be attributed to the in-situ formation of pyridine N-oxide since the latter is an unreactive reoxidant.

By tuning the solvent compositions, Upjohn reported (Tet. Let, 17 [23] 1973 (1976)) that the reaction time could be considerably shortened:

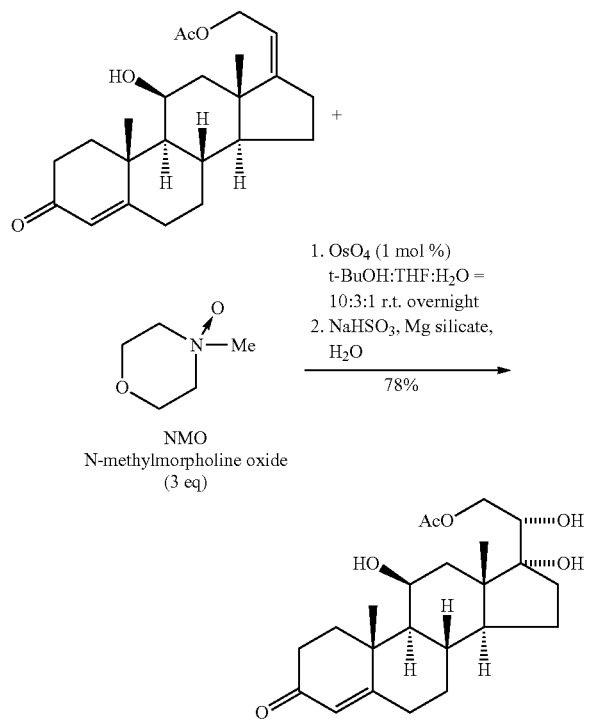

This process is known as Upjohn dihydroxylation. Under similar conditions, other simple olefins were also converted to the corresponding cis-diol compounds in reasonable to good yields.

In the $OsO_4$-catalyzed dihydroxylation of sterically hindered nopol derivatives, the addition of pyridine was found beneficial only if the reoxidant was trimethylamine oxide (Tet. Let. 21[5] 449 (1980)). Under these conditions the hindered α-pinene was dihydroxylated exclusively on the β-side to afford cis-α-pinanediol in 96.5% yield after refluxing 4 days in aqueous tert-butanol in presence of equivalent amount of pyridine. In contrast, when NMO was used as reoxidant, pyridine not only failed to enhance but substantially reduced the relatively mediocre yield of pinandiol (J. Ind. Chem. Soc. 59[2] 119 (1982)

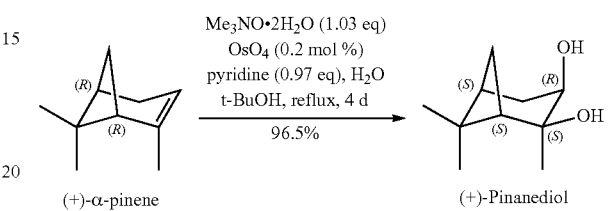

(+)-Pinandiol is key intermediate for the chiral synthesis of Bortezomib (U57714159 to Millennium Pharmaceuticals), an anticancer drug approved by the FDA for treatment multiple myeloma.

The $OsO_4$ catalyzed cis-dihydroxylation of α-cedrene using trimethylamine N-oxide as reoxidant was first reported in Syn. Commun., 28[20], 3757 (1998):

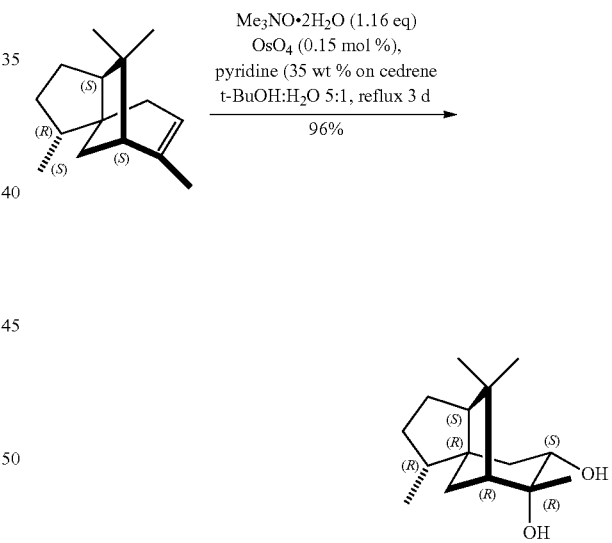

The reaction required 3 days to complete in boiling tert-butanol-water mixture in presence of excess pyridine, though a decent yield was obtained, giving the product having m. p. 162-163° C. and $[α]_D^{30}$ −27.6° (c 1.8, $CH_3OH$).

This procedure is not suitable for economic manufacture of α,α-cedranediol because the reaction time is very long, osmium tetroxide is highly toxic, and the reaction requires a considerable amount of pyridine, a toxic compound that has to be recycled. In addition, the throughput is low since the reaction mixture had to be diluted by 10 times volume of water in the isolation of product, thus generating a large volume of toxic waste stream.

Similar reaction conditions using commercial 50% aqueous solution of NMO as reoxidant were reported in ChemCatChem, 7[6] 907 (2015):

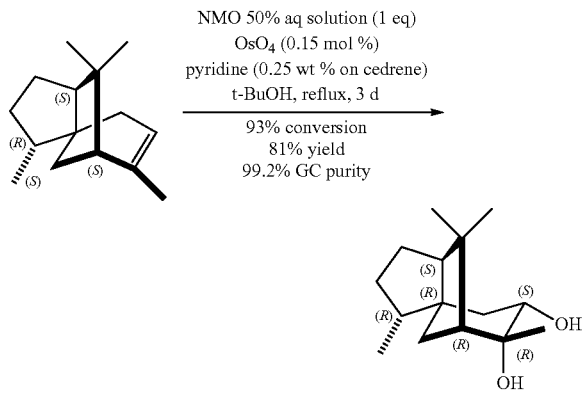

The reaction also requires 3 days to complete and involves using toxic osmium tetroxide in boiling aqueous tert-butanol containing excess pyridine.

Therefore, there is still a need to develop a more efficient and safer industrial process to make this important fragrance product.

SUMMARY OF THE INVENTION

The present invention meets the foregoing need by providing an economic, scalable process for preparation of α,α-cedranediol, and the invention is generally applicable to dihydroxylation of olefins in preparation of other fine chemicals containing a diol function.

In one aspect, the present invention provides a method of preparing a diol compound from an olefin, the method comprising oxidation of the olefin with an oxidant in the presence of a catalytic amount of an osmate (VI) salt in one or more solvent(s) at an elevated temperature.

In some embodiments, sometimes preferred, the osmate (VI) salt is potassium or sodium osmate dihydrate, having a formula of $M_2OsO_4 \cdot 2H_2O$, wherein M is K or Na, which may exist in the form of $M_2OsO_2(OH)_4$.

In some embodiments, the one or more solvents are selected from the group consisting of $C_1$-$C_6$ aliphatic alcohols, mixtures thereof, and their mixtures with water. In some preferred embodiments, the aliphatic alcohols are selected from n-butanols, sec-butanol, isobutanol, tert-butanol, amyl alcohols, and mixtures thereof.

In some embodiments, the oxidant is a tertiary amine N-oxide, including but not limited to trimethylamine N-oxide, tributylamine N-oxide, N-methylmorpholine N-oxide, or the like.

In one particular aspect, the present invention provides a method of preparing α,α-cedranediol, comprising dihydroxylation of α-cedrene with N-methylmorpholine N-oxide in the presence of a catalytic amount of potassium osmate dihydrate ($K_2OsO_4 \cdot 2H_2O$) in solvent comprising a butyl alcohol, preferably isobutanol, at a reflux temperature. The product α,α-cedranediol can be isolated through crystallization from the reaction mixture by cooling down and filtering.

The cis-dihydroxylation of alpha-cedrene in the presence of catalytically effective amount of potassium osmate dihydrate and aqueous N-methylmorpholine-N-oxide as reoxidant in boiling isobutanol affords α,α-cedranediol in high yield and high stereoselectivity in only 24 hours.

The discovery that the use of isobutanol as solvent can drastically reduce the reaction time is surprising and cannot be deduced from the prior art. This appears to be the first time that an aliphatic primary alcohol is used as a solvent for dihydroxylation. In contrast with use of high volatile and/or toxic reagents such as $OsO_4$ and pyridine in the literature methods described above, the use of the non-toxic and non-volatile potassium osmate dihydrate allows the safe large-scale manufacture of α,α-cedranediol.

Other aspects and advantages of the present invention will be more apparent to those of ordinary skill in the art in view of the following detailed description, examples, and claims.

DETAILED DESCRIPTION OF THE INVENTION

The present invention is based on a surprising discovery that osmate (VI) salts, e.g., potassium osmate (VI) dihydrate ($K_2OsO_4 \cdot 2H_2O$), can be used as a safe alternative to $OsO_4$ in dihydroxylation of olefins, which is particularly useful for preparation of α,α-cedranediol, the precursor in the synthesis of (4aR,5R,7aS,9R)-octahydro-2,2,5,8,8,9α-hexamethyl-4H-4a,9-methanoazuleno(5,6-d)-1,3-dioxole (Ambrocenide®), through dihydroxylation of α-cedrene.

In one aspect, the present invention provides a method of preparing a diol compound from an olefin, the method comprising oxidation of the olefin with an oxidant in the presence of a catalytic amount of an osmate (VI) salt in one or more solvent(s) at an elevated temperature.

In one embodiment, the osmate (VI) salt has a general formula $M_jOsO_4$, wherein M is a metal ion or ammonium ion and j is 1 or 2, which may exist in the form of hydrate $M_jOsO_4 \cdot xH_2O$, wherein x is selected from 1 to 6, preferably 2 when j is 1 or 2, e.g., $M_jOsO_4 \cdot 2H_2O$ or $M_jOsO_2(OH)_4$.

In another embodiment, in the osmate salt of formula $M_jOsO_4$, $M_jOsO_4 \cdot 2H_2O$, or $M_jOsO_2(OH)_4$, M is potassium (K) or sodium (Na), and j is 2.

In another embodiment, sometimes preferred, the osmate (VI) salt is $K_2OsO_4 \cdot 2H_2O$ or $K_2OsO_2(OH)_4$.

In one embodiment, the oxidant is a tertiary amine N-oxide.

In one embodiment, the tertiary amine N-oxide has a general formula $R^1R^2R^3N^+$—$O^-$, wherein $R^1$, $R^2$, and $R^3$ are each independently $C_1$-$C_{10}$ alkyl, $C_3$-$C_8$ cycloalkyl, or 3- to 10-membered heterocyclyl; or wherein $R^1$ is a $C_1$-$C_{10}$ alkyl, and $R^2$ and $R^3$ together with the N atom to which they are attached form a 5- to 7-membered heterocyclyl optionally containing 1 or 2 additional heteroatoms selected from O and N.

In another embodiment, sometimes preferred, the oxidant is N-methylmorpholine N-oxide (NMO), sometimes more preferably an aqueous solution of NMO.

In another embodiment, the solvent comprises an aliphatic alcohol, and sometimes preferably a mixture of an aliphatic alcohol and water.

In another embodiment, the aliphatic alcohol is selected from $C_1$-$C_8$ alcohol, isomers thereof, and mixtures thereof, sometimes preferably $C_4$-$C_5$ alcohol, and sometimes more preferably isobutanol.

In another embodiment, the elevated temperature is in the range from 35° C. to reflux temperature of the solvent(s).

In another embodiment, the solvent is a mixture of water and one or more $C_1$-$C_{10}$ aliphatic alcohols, and the elevated temperature is azeotrope temperature of the mixture.

In another embodiment, the alcohol is selected from the group consisting of methanol, ethanol, n-propanol, isopropanol, n-butanol, isobutanol, sec-butanol, tert-butanol, amyl alcohol, iso-amyl alcohol, and mixtures thereof.

In another embodiment, sometimes preferably, the solvent is isobutanol.

In another embodiment, the catalytic amount of osmate (VI) salt is in the range of about 0.05 mol % to about 5 mol % based on the olefin.

In another embodiment, the catalytic amount of osmate (VI) salt is in the range of about 0.1 mol % to about 2 mol % based on the olefin.

In another embodiment, the catalytic amount of osmate (VI) salt is in the range of about 0.2 to about 1 mol % based on the olefin.

In another embodiment, sometimes preferably, the catalytic amount of osmate (VI) salt is in the range of about 0.3 to about 0.5 mol % based on the olefin.

In another embodiment, the elevated temperature is in the range from about 35° C. to about 150° C.

In another embodiment, the elevated temperature is in the range from about 50° C. to about 125° C.

In another embodiment, the elevated temperature is in the range from about 75° C. to about 115° C.

In another embodiment, the elevated temperature is the boiling point of the water-alcohol azeotrope.

In another embodiment, sometimes preferably, the solvent is a mixture of water and isobutanol, and the elevated temperature is 93-95° C.

In another embodiment, the olefin is selected from the group consisting of cedrene, valencene, isopulegol, manool, sclareol, α and β-pinene, camphene, myrcene, ocimene, D-limonene, dipentene, 1-methylcyclohexene, vinylcyclohexane, guaiacol allyl ether, phenyl allyl sulfide, vinyltrimethylsilane, 3-(tert-butyldimethyl silyloxy)-2-methylindene, 3-ethenyl-1,5-dihydro-2,4-benzodioxepin, stilbene, squalene, (2E,4E)-hexa-2,4-diene, 6-methyl-1,5-heptadiene, 2,6-dimethylhepta-1,5-diene, 1,5,9-cyclododecatriene, terpinolene, α-terpineol, β-terpineol, 6-terpineol, allyl alcohol, allyl acetate, allyl chloride, β-citranellol, hydroxycitronellol, linalool, dehydrolinalool, geraniol, eugenol, β-fellandrene, α-thujene, Δ³-carene, nerolidol, trans-β-farnesene, dihydrofarnesol, farnesol, homofarnesol β-caryophyllene, α-bisabolol, 2,4-decadien-1-al, 1-acetylcyclohexene, isofloriffone (1-[(1R,2S)-2,6,6-trimethylcyclohex-3-en-1-yl]ethanone), 6-methyl-5-hepten-2-one, ethyl acrylate, ethylsorbate, (Z)-hex-3-en-1-ol (leaf alcohol).

In another embodiment, sometimes preferably, the olefin is cedrene, and the diol compound is α,α-cedranediol In another embodiment, sometimes preferably, the olefin is cedrene, and the isobutanol:cedrene ratio by weight is in the range of about 0.5 to about 4, preferably about 2.

In another embodiment, the method further includes work-up of the reaction and isolation of the diol compound.

In another embodiment, the isolation comprises crystallization, fractional distillation, or chromatography.

In one particular aspect, the present invention provides a method of preparing α,α-cedranediol, comprising oxidation of cedrene with an oxidant in the presence of a catalytic amount of an osmate (VI) salt in one or more solvent(s) at an elevated temperature.

In one embodiment of this particular aspect, the osmate (VI) salt is potassium osmate dihydrate $K_2OsO_4 \cdot 2H_2O$.

In one embodiment of this particular aspect, the oxidant is N-methylmorpholine N-oxide.

In one embodiment of this particular aspect, the solvent comprises water and a $C_1$-$C_6$ aliphatic alcohol, and the elevated temperature is in the range of about 75° C. to 115° C.

In one embodiment of this particular aspect, the solvent is isobutanol, and the elevated temperature is 93-95° C.

In one embodiment of this particular aspect, the method further includes isolating the α,α-cedranediol through crystallization from reaction mixture by cooling down the reaction mixture and filtering to collect crystalline product.

To illustrate, when used under Upjohn dihydroxylation conditions on α-cedrene using 0.3-0.4 mol % $K_2OsO_4 \cdot 2H_2O$ and commercial 50% aq NMO in a mixture of tert-butanol and acetone, a slow reaction was observed at room temperature, giving only 10% of the desired diol, yet in high selectivity. Increasing the temperature to 50° C. raised the conversion up to 23% after 48 hours. Use of DMF or N,N-dimethylacetamide as solvents and heating to 85-90° C. greatly improved the conversion, affording 85% of the desired diol accompanied by the corresponding undesired ketol after 20 hours.

When various aliphatic alcohols were used as the reaction solvents, varying results were observed. For example, use of boiling ethanol or isopropanol gave clean reactions, but only partial conversion was observed after 24 hours.

When tert-butanol was used as the sole solvent, the reaction gave 68% conversion after boiling at 85° C. for 74 hours and about 18% by-products were observed.

Surprisingly, when isobutanol was used as the solvent, heating to 93-95° C. for 24 hours gave a highly selective reaction in 96-97% conversion. In fact, α,α-cedranediol was formed exclusively, with no traces of β,β-cedranediol detected as shown by gas chromatography results. That is, the osmium catalyst approaches α,α-cedrene only from the less hindered, bottom side (alpha attack):

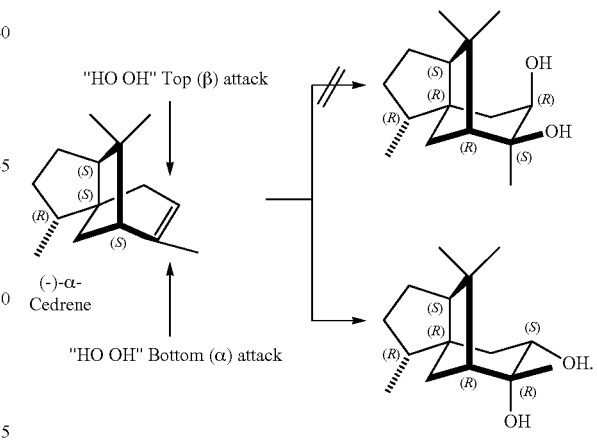

Similar results were obtained when boiling amyl alcohol (mixed isomers) was used. With this solvent mixture, the reaction was completed after 24 hours. The boiling point of the reaction mixture is dictated by the particular water-alcohol azeotrope. This appears to be the first report on the beneficial use of primary aliphatic alcohols as reaction solvents for osmium-catalyzed dihydroxylation of olefins.

The addition of pyridine (Py) did not accelerate the reaction, and when a large excess of pyridine was used, the reaction became slower, presumably due to conversion of the catalyst to the less reactive $OsO_3 \cdot 2Py$.

The desired crystalline α,α-cedranediol was obtained in 81% yield by cooling the reaction mixture to 10° C. for 1 hr. When the temperature was lowered to 2° C. for 3 hours the crystalline product was filtered and stirred with hexane at room temperature for 30 minutes. α,α-Cedranediol was obtained in quantitative yield having a melting point of 166.7° C.

Suitable solvents are butanol, isobutanol, sec-butanol, isobutanol and amyl alcohol (mixture of isomers). The preferred solvent is isobutanol.

The isobutanol:cedrene ratio could vary from 0.5 to 4, with a preferred ratio of 2. The loading of $K_2OsO_4 \cdot 2H_2O$ could vary from 0.1 mol % to 2 mole %, a more preferred range is 0.2 to 0.6 mole %, and still preferred range is 0.38 mol %.

The temperature range vary from 75 to 115° C., the preferred range is the boiling point of the water-alcohol azeotrope, namely 93-95° C.

We applied the new reaction conditions on two other substrates. When valencene having a purity of 85% was dihydroxylated in boiling isobutanol according to the new reaction conditions, valencene-11,12-diol was obtained in quantitative yield after 24 hours.

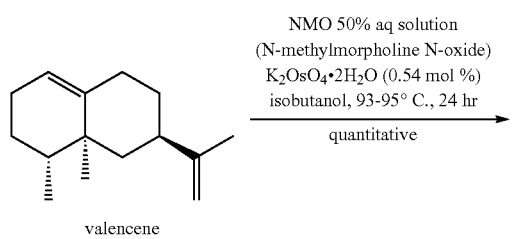

The dihydroxylation of valencene was reported (WO2006128126A1) to proceed in aqueous acetone at room temperature in presence of 1 mol % $OsO_4$ and NMO as reoxidant. The conversion was complete with unspecified yield.

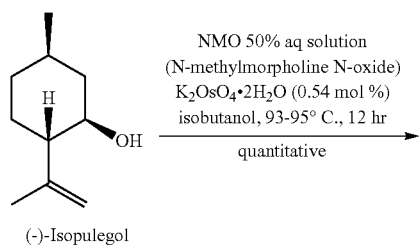

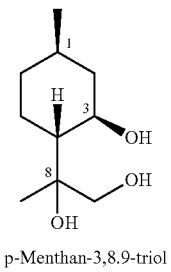

When the new dihydroxylation was applied on isopulegol, p-menthan-3,8,9-triol was obtained as a single isomer in quantitative yield after refluxing for only 12 hours. According to Helv. Chim. Acta, 87[10], 2602 (2004), application of Sharpless AD-mix dihydroxylation on isopulegol was unsatisfactory, giving a mixture of epimers at C8.

The new dihydroxylation conditions were applied on (+)-α-pinene using a refluxing mixture of isobutanol/isoamylalcohol. The reaction was completed in 14 hours to afford (+)-pinandiol quantitatively as single isomer.

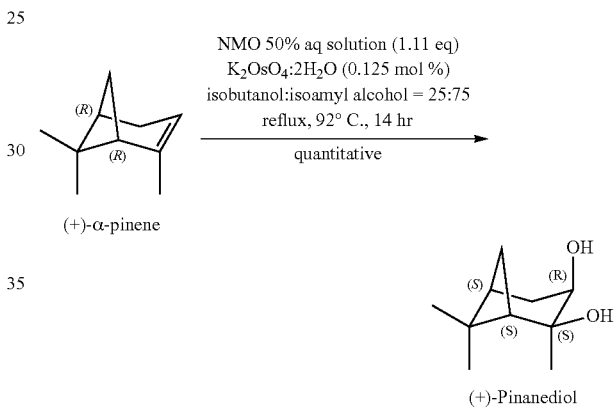

Any terms in the present application, unless specifically defined, will take the ordinary meanings as understood by a person of ordinary skill in the art.

As used herein, the singular forms "a", "an", and "the" include plural reference unless the context clearly dictates otherwise.

As used herein, the term "about" generally includes up to plus or minus 10% of the indicated number. For example, "about 10%" may indicate a range of 9% to 11%, and "about 20" may mean from 18 to 22. Sometimes preferably, the term "about" includes up to plus or minus 5% of the indicated value.

All parts, percentages and proportions refer to herein and in the claims are by weight unless otherwise indicated.

As disclosed herein, a number of ranges of numeric values are provided. It is understood that each intervening value, to the tenth of the unit of the lower limit, unless the context clearly dictates otherwise, between the upper and lower limits of that range is also specifically disclosed.

The phrase "reactor" refers to a device where the reaction actually is conducted.

"Alkyl" refers to a saturated aliphatic hydrocarbon group including $C_1$-$C_{12}$ straight chain and branched chain groups. Preferably an alkyl group is an alkyl having 1 to 8, sometimes more preferably 1 to 6, carbon atoms. Representative examples include, but are not limited to, methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylbutyl, 2,2-dimethylbutyl, 1,3-dimethylbutyl, 2-ethylbutyl, 2-methylpentyl, 3-methylpentyl, 4-methylpentyl, 2,3-dimethylbutyl, or the like.

"Cycloalkyl" refers to a saturated and/or partially unsaturated monocyclic hydrocarbon group having 3 to 8 carbon atoms, sometimes preferably 3 to 6 carbon atoms. Representative examples of monocyclic cycloalkyls include, but are not limited to, cyclopropyl, cyclobutyl, cyclopentyl, cyclopentenyl, cyclohexyl, cyclohexenyl, cyclohexadienyl, cycloheptyl, cycloheptatrienyl, cyclooctyl, or the like.

"Heterocyclyl" refers to a 3 to 10-membered, sometimes preferably 5- to 6-membered, saturated and/or partially unsaturated monocyclic or polycyclic hydrocarbon group having one or more heteroatoms selected from the group consisting of N and O. Representative examples of monocyclic heterocyclyls include, but are not limited to, pyrrolidyl, piperidyl, piperazinyl, morpholinyl, or the like.

The following non-limiting examples serve to illustrate certain aspects of the invention.

EXAMPLES

Example 1

To a 1 L reactor equipped with a mechanical stirrer and a reflux condenser were added technical grade (−)-alpha-cedrene (110 g, 91% purity, 0.49 mol, $[\alpha]_D^{20}=-84.2°$, neat), isobutyl alcohol (200 g), potassium osmate dihydrate (0.7 g, 1.9 mmol, 0.39 mol %) and N-methylmorpholine N-oxide 50 wt % in water (235 g, 1 mol). The reaction mixture was heated to 93-95° C., at which gentle reflux was maintained for 24 hours. GC analysis indicated that only 3-4% unreacted alpha-cedrene remained and only single diastereoisomer of cis-cedranediol was obtained.

The reaction mixture was cooled for 3 hr at 2° C. to obtain a crystalline product, which was filtered and washed with water. The crystals were transferred to the reactor, to which 3 parts of hexane were added, and the mixture was stirred at room temperature for 30 min to afford white crystals. Thus, 115 g of the desired product was obtained in nearly quantitative yield and 99.5% purity by filtration and drying, having m. p. 166.1° C. (Lit. 165° C.) and $[\alpha]_D^{20}=-21.18°$ (c 0.7% CHCl$_3$). The NMR spectrum matches the literature data (ChemCatChem, 7[6] 907 (2015) Supporting Information).

Example 2

To a 1 L reactor equipped with a mechanical stirrer and a reflux condenser were added (−)-alpha-cedrene (110 g, 91% purity, 0.49 mol, $[\alpha]_D^{20}=-84.2°$, neat), isobutyl alcohol (200 g), potassium osmate dihydrate (1 g, 2.68 mmol, 0.54 mol %) and N-methylmorpholine N-oxide 50 wt % in water (200 g, 0.853 mol)). The reaction mixture was heated to 93-95° C., at which gentle reflux was maintained for 24 hours. GC analysis indicated that only 3-4% unreacted alpha-cedrene remained and only single diastereoisomer of cis-cedranediol was obtained.

The reaction mixture was cooled down during 1 hr to 10° C. to obtain a crystalline product, which was filtered on a Buchner funnel and washed with water. The crystals were transferred to the reactor, to which 3 parts of hexane were added and the mixture was stirred at room temperature for 30 min to afford white crystals. Thus, 95 g of the desired product was obtained by filtration and drying in 81% yield and 99.5% purity, having m. p. 166.1° C. (Lit. 165° C.).

Example 3

To a 1 L reactor equipped with a mechanical stirrer and a reflux condenser were added alpha-cedrene (110 g, 91% purity, 0.49 mol, $[\alpha]_D^{20}=-84.2°$, neat), isoamyl alcohol (100 g, mixture of isomers, Merck b. p. 131° C.), potassium osmate dihydrate (0.7 g, 0.39 mol %) and NMO 50 wt % in water (235 g, 1.0 mol). The reaction mixture was heated to 93-95° C., at which gentle reflux was maintained for 24 hours. GC analysis indicated that only 3-4% unreacted alpha-cedrene remained and only single diastereoisomer of cis-cedranediol was obtained.

The reaction mixture was cooled during 1 hr to 10° C. and filtered to obtain a crystalline product, which was collected on a Buchner funnel and washed with water. The crystals were transferred to the reactor, to which 3 parts of hexane were added, and the mixture was stirred at room temperature for 30 min. A white crystalline product was obtained in 81% yield (95 g) and 99.5% purity, m. p. 166.1° C. (Lit. 165° C.).

Example 4

To a 1 L reactor equipped with a mechanical stirrer and a reflux condenser were added valencene (117.8 g, 85% purity, 0.49 mol), isobutyl alcohol (100 g), potassium osmate dihydrate (0.7 g, 0.39 mol %), and NMO 50 wt % in water (235 g, 1.0 mol). The mixture was heated to 93-95° C., at which gentle reflux was maintained for 24 hours. GC analysis indicated a complete conversion of valencene to valencene-11,12-diol. The reaction mixture was treated by aqueous sodium hydrosulfite and Celite®, followed by filtration. The filtrate was acidified to pH 2 with 12N H$_2$SO$_4$ to convert the N-methyl morpholine to its hydrosulfate salt. The phases were separated, the aqueous phase was extracted with isobutanol, and the combined organic phases were washed with 25% aq. NaCl. The isobutanol was distilled under reduced pressure. The residue was fractionally distilled under vacuum to give the desired product as a light yellow oil. The yield was 95%.

Example 5

To a 1 L reactor equipped with a mechanical stirrer and a reflux condenser were added (−)-isopulegol (76 g, 99.5% purity, 0.49 mol), isobutyl alcohol (100 g), potassium osmate dihydrate (0.7 g, 0.39 mol %), and NMO 50 wt % in water (235 g, 1.0 mol). The reaction mixture was heated to 93-95° C., at which gentle reflux was maintained for 12 hours. GC analysis indicated a complete conversion of (−)-Isopulegol to a single diastereomer of p-menthan-3,8.9-triol. Usual workup of the reaction mixture gave the desired product as an oil. Fractional distillation gave pure p-menthan-3,8.9-triol boiling at 140-145° C./0.08 torr. The yield was 93%.

Example 6

To a 1 L reactor equipped with a mechanical stirrer and a reflux condenser were added (+)-α-pinene (100 g, 92% purity, 0.67 mol), isobutyl alcohol (25 g), isoamyl alcohol (75 g, mixture of isomers, b. p. 131° C.) potassium osmate dihydrate (0.20 g, 0.08 mol %), and NMO 50 wt % in water (175 g, 0.744 mol). The reaction mixture was heated to 92°

C., at which gentle reflux was maintained for 14 hours. GC analysis indicated a complete conversion of (+)-α-pinene to a single diastereoisomer of (+)-Pinanediol. The reaction mixture was diluted with 250 mL water and extracted with hexane (2×200 mL). The combined organic phases were washed with 100 mL water. The solvent was evaporated to give white solid. The yield according to internal standard was 96%.

All publications cited herein are incorporated by reference in their entirety for all purposes. While several embodiments have been described in the Examples above, it will be understood by those of ordinary skill in the art that various changes in form and details may be made therein without departing from the spirit and scope of the disclosure as defined by the following claims.

What is claimed is:

1. A method of preparing a diol compound from an olefin, the method comprising oxidation of the olefin with an oxidant in the presence of a catalytic amount of an osmate (VI) salt in one or more solvent(s) at an elevated temperature,
   wherein the elevated temperature is in the range from 35° C. to reflux temperature of the one or more solvent(s),
   wherein the osmate (VI) salt has a general formula $M_jOsO_4$, $M_jOsO_4 \cdot 2H_2O$, or $M_jOsO_2(OH)_4$, wherein M is a metal ion or ammonium ion, and j is 1 or 2,
   wherein the one or more solvent(s) comprises an alcohol selected from the group consisting of n-butanol, isobutanol, sec-butanol, amyl alcohol, iso-amyl alcohol, and mixtures thereof,
   wherein the oxidant is a tertiary amine N-oxide having a general formula $R^1R^2R^3N^+$—$O^-$, wherein $R^1$ is a $C_1$-$C_{10}$ alkyl, and $R^2$ and $R^3$ together with the N atom to which they are attached form a 5- to 7-membered heterocyclyl optionally containing 1 or 2 additional heteroatoms selected from O and N, and
   wherein the olefin is selected from the group consisting of cedrene, valencene, isopulegol, manool, sclareol, α and β-pinene, camphene, myrcene, ocimene, D-limonene, dipentene, squalene, (2E,4E)-hexa-2,4-diene, 6-Methyl-1,5-heptadiene, 2,6-dimethylhepta-1,5-diene, 1,5,9-cyclododecatriene, terpinolene, α-terpineol, β-terpineol, δ-terpineol, allyl alcohol, allyl chloride, β-citranellol, hydroxycitronellol, linalool, dehydrolinalool, geraniol, eugenol, β-fellandrene, α-thujene, $\Delta^3$-carene, nerolidol, trans-β-farnesene, dihydro farnesol, farnesol, homofarnesol β-caryophyllene, α-bisabolol, 2,4-Decadien-1-al, 1-acetylcyclohexene, Isofloriffone (1-[(1R,2S)-2,6,6-trimethylcyclohex-3-en-1-yl]ethanone), 6-Methyl-5-hepten-2-one, ethyl sorbate, and (Z)-hex-3-en-1-ol (leaf alcohol).

2. The method of claim 1, wherein M is potassium (K) or sodium (Na), and j is 2.

3. The method of claim 1, wherein the osmate (VI) salt is $K_2OsO_4 \cdot 2H_2O$ or $K_2OsO_2(OH)_4$.

4. The method of claim 1, wherein the oxidant is N-methylmorpholine N-oxide.

5. The method of claim 1, wherein the one or more solvent(s) further comprises water.

6. The method of claim 1, wherein the one or more solvent(s) comprises isobutanol.

7. The method of claim 1, wherein the catalytic amount of osmate (VI) salt is in the range of about 0.05 mol % to about 5 mol % based on the olefin.

8. The method of claim 1, wherein the elevated temperature is in the range of from about 75° C. to about 115° C.

9. The method of claim 1, wherein the one or more solvent(s) is a mixture of water and isobutanol, and the elevated temperature is 93-95° C.

10. The method of claim 1, wherein the one or more solvent(s) comprises iso-amyl alcohol.

11. A method of preparing α,α-cedranediol, comprising oxidation of cedrene with an oxidant in the presence of a catalytic amount of an osmate (VI) salt in one or more solvent(s) at an elevated temperature,
    wherein the elevated temperature is in the range from 35° C. to reflux temperature of the one or more solvent(s),
    wherein the osmate (VI) salt has a general formula $M_jOsO_4$, $M_jOsO_4 \cdot 2H_2O$, or $M_jOsO_2(OH)_4$, wherein M is a metal ion or ammonium ion, and j is 1 or 2,
    wherein the one or more solvent(s) comprises an alcohol selected from the group consisting of n-butanol, isobutanol, sec-butanol, amyl alcohol, iso-amyl alcohol, and mixtures thereof, and
    wherein the oxidant is a tertiary amine N-oxide having a general formula $R^1R^2R^3N^+$—$O^-$, wherein $R^1$ is a $C_1$-$C_{10}$ alkyl, and $R^2$ and $R^3$ together with the N atom to which they are attached form a 5- to 7-membered heterocyclyl optionally containing 1 or 2 additional heteroatoms selected from O and N.

12. The method of claim 11, wherein the osmate (VI) salt is potassium osmate dihydrate $K_2OsO_4 \cdot 2H_2O$.

13. The method of claim 11, wherein the oxidant is N-methylmorpholine N-oxide.

14. The method of claim 11, wherein the one or more solvent(s) further comprises water.

15. The method of claim 11, wherein the one or more solvent(s) comprises isobutanol.

16. The method of claim 11, wherein the one or more solvent(s) comprises iso-amyl alcohol.

17. The method of claim 11, wherein the one or more solvent(s) is a mixture of water and isobutanol, and the elevated temperature is 93-95° C.

* * * * *